US011628767B2

(12) United States Patent
Kim et al.

(10) Patent No.: US 11,628,767 B2
(45) Date of Patent: Apr. 18, 2023

(54) METHOD OF PLAYING VIRTUAL AFTER-BURN SOUND IN ELECTRIC VEHICLE

(71) Applicants: Hyundai Motor Company, Seoul (KR); Kia Motors Corporation, Seoul (KR)

(72) Inventors: Ki Chang Kim, Gyeonggi-do (KR); Jin Sung Lee, Gyeonggi-do (KR); Jeong Soo Eo, Gyeonggi-do (KR); Dong Chul Park, Gyeonggi-do (KR); Tae Kun Yun, Gyeonggi-do (KR); Ji Won Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 17/217,118

(22) Filed: Mar. 30, 2021

(65) Prior Publication Data

US 2022/0185179 A1   Jun. 16, 2022

(30) Foreign Application Priority Data

Dec. 14, 2020   (KR) .......................... 10-2020-0174015

(51) Int. Cl.
*B60Q 5/00* (2006.01)
*G10K 9/00* (2006.01)

(52) U.S. Cl.
CPC .................................. *B60Q 5/008* (2013.01)

(58) Field of Classification Search
CPC . B60Q 5/008; B60Q 5/00; G10K 9/00; Y02T 10/72; H04R 5/00

USPC .................................. 381/71.4, 86, 302, 389
See application file for complete search history.

(56) References Cited

U.S. PATENT DOCUMENTS

2017/0129397 A1* 5/2017  Gee .......................... B60Q 5/008

FOREIGN PATENT DOCUMENTS

| KR | 20120077630     | * | 7/2012  | ............... H04R 5/00 |
|----|-----------------|---|---------|--------------------------|
| KR | 101926990   B1  |   | 12/2018 |                          |
| KR | 101947317   B1  |   | 2/2019  |                          |
| KR | 2019-0051451 A  |   | 5/2019  |                          |

* cited by examiner

*Primary Examiner* — Yosef K Laekemariam
(74) *Attorney, Agent, or Firm* — Fox Rothschild LLP

(57) ABSTRACT

A method of playing a virtual after-burn sound in an electric vehicle is provided. The method includes acquiring driver tendency information generated based on information of music played in a mobile phone and collecting driving variable information for playing a virtual sound during operation of the electric vehicle. Additionally, characteristics of a virtual after-burn sound are determined based on the collected driving variable information. The characteristics of the virtual after-burn sound are corrected according to the acquired driver tendency information. An after-burn signal is generated for playing the virtual after-burn sound based on information about the corrected characteristics of the virtual after-burn sound and operation of sound equipment is adjusted according to the created after-burn signal such that a virtual after-burn sound discriminated according to the driver tendency is played and output from the sound equipment.

16 Claims, 14 Drawing Sheets

FIG. 11

| STEP 1: DRIVER WHO USES APPLICATION FIRST SELECTS PLAYLIST PRECONFIGURED BASED ON FEELING, MOOD, OR ATMOSPHERE AFTER BOARDING THE VEHICLE OR CONFIGURES PLAYLIST SUITABLE FOR THEIR MUSICAL TASTE USING MUSIC RETRIEVAL FUNCTION |
|---|

| STEP 2: AFTER LISTENING FOR PREDETERMINED TIME, APPLICATION AUTOMATICALLY ANALYZES DRIVER TENDENCY TO SELECT OPTIMUM SOUND |
|---|

| STEP 3: AFTER SOUND SELECTION, SOUND INFORMATION RELATED TO THEIR TENDENCY CAN BE CONSTRUCTED AS DB (CONSIDERING PERSONALIZATION AND COMMON USE) |
|---|

FIG. 13

| CLASSIFICATION | FREQUENCY |
|---|---|
| Bass | 20~200 Hz |
| Low-mid | 200~700 Hz |
| Mid-mid | 700~2,000 Hz |
| High-mid | 2,000~5,000 Hz |
| Treble | 5,000~20,000 Hz |

FIG. 14

| ORDER | RANGE (FREQUENCY) | |
|---|---|---|
| | MUSIC | VEHICLE SOUND |
| 1 | Bass | Booming |
| 2 | Low-mid | Rumble |
| 3 | Mid-mid | Combustion Noise |
| 4 | Upper-mid | High freq. Noise |
| 5 | Treble | |

FIG. 15

| GENRE | VOLUME AVERAGE(dB) | STANDARD DEVIATION |
|---|---|---|
| EMD | -9.73 | 1.09 |
| Newage | -19.79 | 3.03 |
| Rap/Hiphop | -10.72 | 1.42 |
| Rock/Metal | -12.52 | 1.39 |
| Ballad | -13.15 | 2.52 |
| Jazz | -16.98 | 3.75 |
| Classic | -20.08 | 3.72 |
| Trot | -10.72 | 1.30 |

FIG. 16

| CLASSIFICATION | CHARACTERISTICS OF TENDENCY |
|---|---|
| Openness to Experience | TENDENCY OF HAVING IMAGINATIVE POWER, CURIOSITY, ADVENTUROUS SPIRIT, AND ARTISTIC SENSE AND OPPOSING CONSERVATISM |
| Conscientiousness | TENDENCY OF EARNESTLY MAKING EFFORTS TO ACHIEVE GOAL |
| Extraversion | TENDENCY OF PURSUING SOCIAL CONTACT WITH OTHER PEOPLE, STIMULATION, AND VITALITY |
| Agreeableness | TENDENCY OF TAKING COOPERATIVE ATTITUDE TOWARD OTHER PEOPLE WITHOUT HOSTILITY |
| Neuroticism | TENDENCY OF EASILY FEELING UNPLEASANT EMOTION, SUCH AS ANGER, DEPRESSION, AND SENSE OF UNEASE |

FIG. 17

| CLASSIFICATION | CHARACTERISTICS OF TENDENCY |
|---|---|
| Reflective & Complex | Classical, Jazz, Blues, Folk |
| Intensive & Rebellious | Alternative, Rock, Heavy metal |
| Upbeat & Conventional | Country, Pop, Religious |
| Energetic & Rhythmic | Electronic/Dance, Rap/Hip-Hop, Soul/Funk |

| CLASSIFICATION | Openness | Conscientiousness | Extraversion | Agreeableness | Neuroticism |
|---|---|---|---|---|---|
| Reflective & Complex | 0.35* | -0.01 | 0.00 | 0.09 | -0.18 |
| Intensive & Rebellious | 0.15 | -0.10 | -0.04 | -0.03 | -0.11 |
| Upbeat & Conventional | -0.36* | 0.23* | 0.09 | 0.13 | 0.09 |
| Energetic & Rhythmic | 0.32 | -0.12 | 0.22 | -0.07 | 0.02 |

FIG. 18

METHOD OF PLAYING VIRTUAL AFTER-BURN SOUND IN ELECTRIC VEHICLE

CROSS-REFERENCE TO RELATED APPLICATION

This application claims, under 35 U.S.C. § 119(a), the benefit of priority to Korean Patent Application No. 10-2020-0174015 filed on Dec. 14, 2020, the entire contents of which are incorporated herein by reference.

BACKGROUND

(a) Technical Field

The present disclosure relates to a method of playing a virtual after-burn sound in an electric vehicle including no internal combustion engine capable of virtually playing an after-burn sound in an internal combustion engine vehicle depending on the driving condition of the vehicle.

(b) Background Art

As is generally known, an electric vehicle (EV) is a vehicle that is driven using a motor. An electric vehicle includes a battery configured to supply power necessary to drive a motor, an inverter connected to the battery to drive and control the motor, the motor being connected to the battery via the inverter, and a decelerator configured to decelerate rotational force of the motor and to transmit the decelerated rotational force to a driving wheel.

In particular, the inverter converts direct-current (DC) current supplied from the battery into alternating-current (AC) current and supplies the AC current to the motor via a power cable at the time of driving the motor, and converts AC current generated by the motor into DC current and supplies the DC current to the battery to charge the battery at the time of regenerating the motor. In addition, the motor, which is a driving source configured to drive the vehicle, is connected to the driving wheel via the decelerator to transmit power thereto.

A general electric vehicle uses no multistage transmission, unlike a conventional internal combustion engine vehicle, and the decelerator, which uses a fixed gear ratio, is disposed between the motor and the driving wheel instead. The reason for this is that an internal combustion engine (ICE) has a wide energy efficiency distribution range depending on driving points and provides high torque only at a high-speed region, whereas the motor has a relatively small difference in efficiency with respect to driving points and is capable of realizing high torque at a low speed through only the characteristics of a single motor.

In addition, a vehicle equipped with a conventional internal combustion engine driving system requires an oscillation mechanism, such as a torque converter or a clutch, due to the characteristics of the internal combustion engine, which cannot be driven at a low speed, whereas the oscillation mechanism may be omitted from the driving system of the electric vehicle since the motor is capable of being easily driven at a low speed.

Due to such a difference in mechanism, the electric vehicle may provide smooth drivability without discontinuity due to shift, unlike the internal combustion engine vehicle. Furthermore, the conventional internal combustion engine vehicle burns fuel to generate power, whereas the driving system of the electric vehicle drives the motor using electric power of the battery to generate power. Unlike torque of the internal combustion engine created by aerodynamic and thermodynamic reactions, therefore, torque of the electric vehicle is generally more sophisticated, smoother, and more rapidly reactive than the torque of the internal combustion engine.

The above characteristics act as positive factors in the electric vehicle. For a high-performance vehicle, however, various effects generated by noise, physical vibration, and thermodynamic action of the internal combustion engine may be emotionally important occasionally. One of the factors unable to be provided by the electric vehicle due to the characteristics thereof is an after-burn sound, which may be frequently felt in a high-performance internal combustion engine vehicle.

The after-burn sound is a sound generated due to a change in pressure at an exhaust system of the internal combustion engine. In a high-performance vehicle, when rich fuel is discharged through an exhaust manifold in the state of being burnt in a cylinder of the engine for various reasons, the fuel expands in a high-temperature exhaust pipe, whereby the after-burn sound is generated. The after-burn sound enables a vehicle passenger, including a driver, to feel a dynamic driving sensation and dynamic realism.

Accordingly, technology for playing the after-burn sound as in the internal combustion engine vehicle is required for the electric vehicle. In particular, electric vehicles having driver needs considering driving acceleration sensation reflected therein have been required, and moreover there is a need for technology capable of discriminating an after-burn sound according to the individual tendency of a driver and providing the discriminated after-burn sound.

The above information disclosed in this section is provided merely for enhancement of understanding of the background of the invention and therefore it may contain information that does not form the prior art that is already known in this country to a person of ordinary skill in the art.

SUMMARY

The present invention provides a method of playing a virtual after-burn sound in an electric vehicle including no internal combustion engine capable of virtually playing an after-burn sound in an internal combustion engine vehicle depending on the driving condition of the vehicle. Additionally, the present invention provides a method of playing a virtual after-burn sound in an electric vehicle capable of discriminating and producing an after-burn sound according to the individual tendency of a driver.

The objects of the present invention are not limited to those described above, and other unmentioned objects of the present invention will be clearly understood by a person of ordinary skill in the art (hereinafter referred to as an "ordinary skilled person") from the following description.

To accomplish the object, in an aspect, the present invention provides a method of playing a virtual after-burn sound in an electric vehicle that may include acquiring, by a controller, driver tendency information created based on information of music played on a driver's mobile phone, collecting, by the controller, driving variable information for playing a virtual sound during travelling of the electric vehicle, determining, by the controller, characteristics of a virtual after-burn sound based on the collected driving variable information, correcting, by the controller, the characteristics of the virtual after-burn sound according to the acquired driver tendency information, creating, by the controller, an after-burn signal for playing the virtual after-burn sound based on information about the corrected characteristics of the virtual after-burn sound, and controlling, by the controller, operation of sound equipment according to the created after-burn signal to play a virtual after-burn sound discriminated according to the driver tendency and output the sound from the sound equipment.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein:

FIG. 11 is a view showing the operation state and operation process of a mobile phone application for individual discrimination of a virtual after-burn sound in an exemplary embodiment of the present invention;

FIGS. 13 to 18 are views related to creation of driver tendency information for describing an exemplary embodiment of the present invention.

Figure 1:
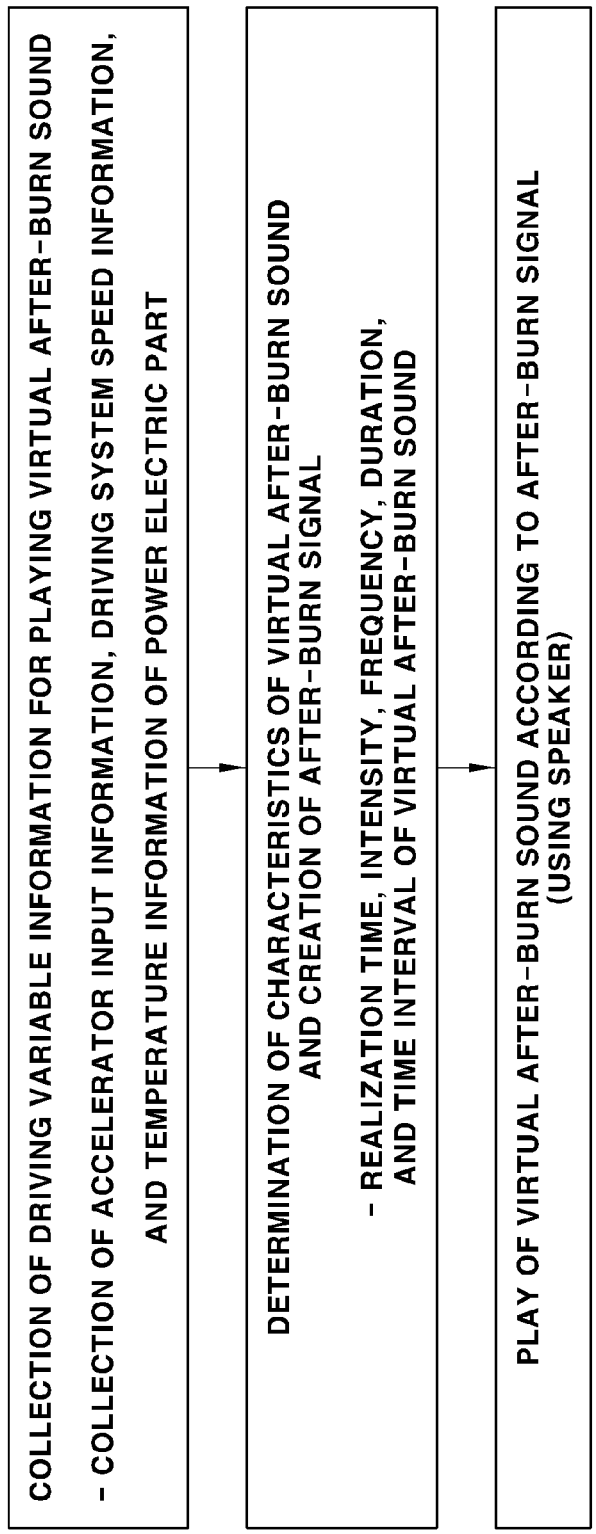
FIG. 1 is a block diagram showing a virtual after-burn sound playing method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

Specific structural or functional descriptions of the exemplary embodiments of the present invention disclosed in this specification are given only for illustrating exemplary embodiments of the present invention. Embodiments of the present invention may be realized in various forms. In addition, the exemplary embodiments according to the concept of the present invention are not limited to such specific exemplary embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood as being limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Wherever possible, the same reference numbers will be used throughout the drawings to refer to the same or like parts. The terms used in this specification are provided only to explain specific embodiments, but are not intended to restrict the present invention. A singular representation may include a plural representation unless it represents a definitely different meaning from the context. It will be further understood that the terms "comprises", "comprising" and the like, when used in this specification, specify the presence of stated components, steps, operations, and/or elements, but do not preclude the presence or addition of one or more other components, steps, operations, and/or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

The present invention provides an apparatus and method for playing a virtual after-burn sound in an electric vehicle including no internal combustion engine capable of virtually producing an after-burn sound in an internal combustion engine vehicle depending on the driving condition of the vehicle. Furthermore, the present invention provides a virtual after-burn sound playing method in an electric vehicle capable of discriminating between after-burn sounds based on driver tendency and producing the discriminated after-burn sound.

In the present invention, production of a virtual after-burn sound or virtual production of an after-burn sound refers to auditory production of playing a sound effect simulating an after-burn sound in an internal combustion engine vehicle through sound equipment. In addition, an after-burn sound to be virtually produced in the present invention is an event exhaust sound generally generated at the rear of an internal combustion engine vehicle. In the case in which, in an electric vehicle, a virtual engine sound generated at the front of the vehicle is produced and provided, it is possible to further produce and provide a virtual after-burn sound together with the virtual engine sound.

An internal combustion engine (ICE) having an intake system and an exhaust system is absent in an electric vehicle. In the present invention, however, an after-burn signal having the characteristics of a virtual after-burn sound is created using driving variable information in an electric vehicle, and a virtual after-burn sound is played through sound equipment according to the created after-burn signal.

FIG. 1 is a block diagram showing a virtual after-burn sound playing method according to an exemplary embodiment of the present invention. In the following description, a motor refers to a driving motor connected to a driving wheel to drive a vehicle unlike specified otherwise. In addition, those skilled in the art will understand that an internal combustion engine and an engine are used as the same meaning in the following description.

In the present invention, driving variable information for playing a virtual after-burn sound during traveling of a vehicle is collected in real time, an after-burn signal having the characteristics of a virtual after-burn sound is generated in real time based on the collected driving variable information, and a virtual after-burn sound is output through sound equipment according to the generated after-burn signal (production of a sound effect). The driving variable information input to a controller to be used to play and produce a virtual after-burn sound is information about a real system that an electric vehicle has, and may be real-time vehicle driving information in the electric vehicle. In addition, the vehicle driving information may include driver input information and driving state information in an actual electric vehicle.

The vehicle driving information may be sensor detection information detected by a sensor and input through a vehicle network, information determined by a controller of the present invention itself, or information input from another controller in the vehicle to the controller of the present invention through the vehicle network. Specifically, vehicle driving information for playing and producing the after-burn sound may include at least one of an accelerator input value (APS value), which is driver input information, motor torque (motor torque command), which is driving state information, the speed of a driving system, and the temperature of a power electronic part. In addition, the vehicle driving information may further include at least one of the rate of change (the gradient of change) of the accelerator input value and an integral value of the accelerator input value, as driver input information, and the rate of change (the gradient of change) of motor torque and an integral value of the motor torque, as driving state information.

In particular, the accelerator input value is based on driver manipulation of the accelerator, and may be information detected by an accelerator detector, as will be described below. The rate of change of the accelerator input value refers to the gradient of change of the accelerator input value, which may be obtained by acquiring the gradient of an accelerator position sensor (APS) signal.

The motor torque may become a motor torque command (a reference motor torque command, which will be described below) determined by the controller based on the vehicle driving information collected in the vehicle. In addition, the rate of change of the motor torque may refer to the gradient of change of the motor torque command. The determination and creation method and process of the motor torque command to adjust the torque output of the driving motor in the electric vehicle are well known in the art to which the present invention pertains, and therefore a detailed description thereof will be omitted.

The driving system speed information may be one or both of speed and acceleration. The speed is rotational speed of a vehicle driving system part, which may be motor speed, the wheel speed of the driving wheel (driving wheel speed), or drive shaft speed. In addition, the acceleration may be rotational acceleration of the motor, the driving wheel, or the drive shaft, which may be obtained by differentiating a signal of the motor speed, a single of the wheel speed, or a signal of the drive shaft speed or may be an actually measured value measured by the acceleration sensor.

In addition, in an exemplary embodiment of the present invention, virtual engine speed, which is a virtual variable, may be used as driving system speed information for playing a virtual after-burn sound. The virtual engine speed is virtual speed determined by the controller based on the driving variable information. In an exemplary embodiment of the present invention, a predetermined virtual internal combustion engine model may be used in acquiring the virtual engine speed from actual driving variable information in the electric vehicle.

In an exemplary embodiment of the present invention, in the case in which a virtual internal combustion engine model including a virtual engine and a virtual transmission is used, virtual engine speed becomes input speed of the virtual transmission. The virtual engine speed may be calculated as a variable multiple value of driving system speed measured by a speed detector. In particular, the driving system speed may be motor speed. At this time, the value of a coefficient multiplied by the motor speed to calculate the virtual engine speed may be a value set based on the virtual transmission, a gear ratio model, and a virtual current shift stage.

A control method for creating virtual shift quality in an electric vehicle having no multistage transmission to create and realize multistage shift quality through torque control of a driving motor in the electric vehicle is known. In addition, using virtual engine speed as one of the virtual variables necessary to create and realize multistage shift quality during a control process for creating virtual shift quality of the electric vehicle is known.

The virtual engine speed, which is one of the virtual variables used to create and realize multistage shift quality, may be used as a virtual variable for playing a virtual after-burn sound in the present invention. In an exemplary embodiment of the present invention, a virtual after-burn production controller may be configured to determine virtual engine speed using virtual vehicle speed and gear ratio information of the virtual current shift stage.

Particularly, the virtual vehicle speed may be calculated as a value directly proportional to actual motor speed, which is one piece of the actual driving variable (input variable) information, using the actual motor speed and a virtual final reduction gear ratio. The virtual final reduction gear ratio is a value preset in the virtual after-burn production controller. In an exemplary embodiment of the present invention, virtual vehicle speed may be calculated using actual motor speed measured during traveling of the vehicle (e.g., while the vehicle is being driven) and virtual final reduction gear ratio, and virtual engine speed may be calculated in real time by the virtual vehicle speed.

At this time, virtual engine speed may be acquired from a value obtained by multiplying the virtual vehicle speed by the virtual gear ratio of the virtual current shift stage, or virtual engine speed may be acquired from a value obtained by multiplying the driving system speed, such as the motor speed, by the virtual gear ratio of the virtual current shift stage.

In addition, the virtual current shift stage may be determined according to a shift schedule map preset in the virtual after-burn production controller from the virtual vehicle speed and the accelerator input value (the APS value). When the virtual current shift stage is determined, the virtual engine speed may be calculated in real time using a virtual gear ratio corresponding to the shift stage and the virtual vehicle speed or the motor speed.

The temperature of the power electronic (PE) part is temperature detected by a temperature sensor. In particular, the power electronic part may be a power electronic part related to vehicle driving in the electric vehicle, such as a driving system part. In the present invention, the temperature of the power electronic part may be motor temperature or battery temperature, or may be the temperature of any power electronic part other than the motor and the battery, such as the temperature of an inverter or the temperature of another vehicle driving system part.

In the electric vehicle, to cool power electronic (PE) parts, such as the motor, the battery, and the inverter, a water-cooling system for circulating a coolant between these parts and a radiator is used. The temperature of the part may be the temperature of the coolant detected by the temperature sensor.

In the present invention, the controller may be configured to determine the characteristics of a virtual after-burn sound directly using actual driving variable information in the electric vehicle, using virtual variable information (virtual driving variable information, such as virtual engine speed) obtained from actual driving variable information, or using both the actual driving variable information and the virtual variable information.

Particularly, the characteristics of a virtual after-burn sound may include the realization time at which a virtual after-burn sound starts to be played through sound equipment. In addition, the characteristics of the virtual after-burn sound may further include at least one of intensity, duration, time interval, and frequency band or pitch (high and low of sound). The intensity of the virtual after-burn sound means volume.

When the characteristics of the virtual after-burn sound are determined, as described above, the controller may be configured to generate an after-burn signal based on the determined characteristics of the virtual after-burn sound, and operate the sound equipment according to the created after-burn signal such that the virtual after-burn sound is played. In addition, when virtual variable information in an internal combustion engine is acquired from the actual driving variable information in the electric vehicle by the controller, as described above, the virtual internal combustion engine model previously constructed and stored in the controller, as previously described, may be used.

Figure 2:
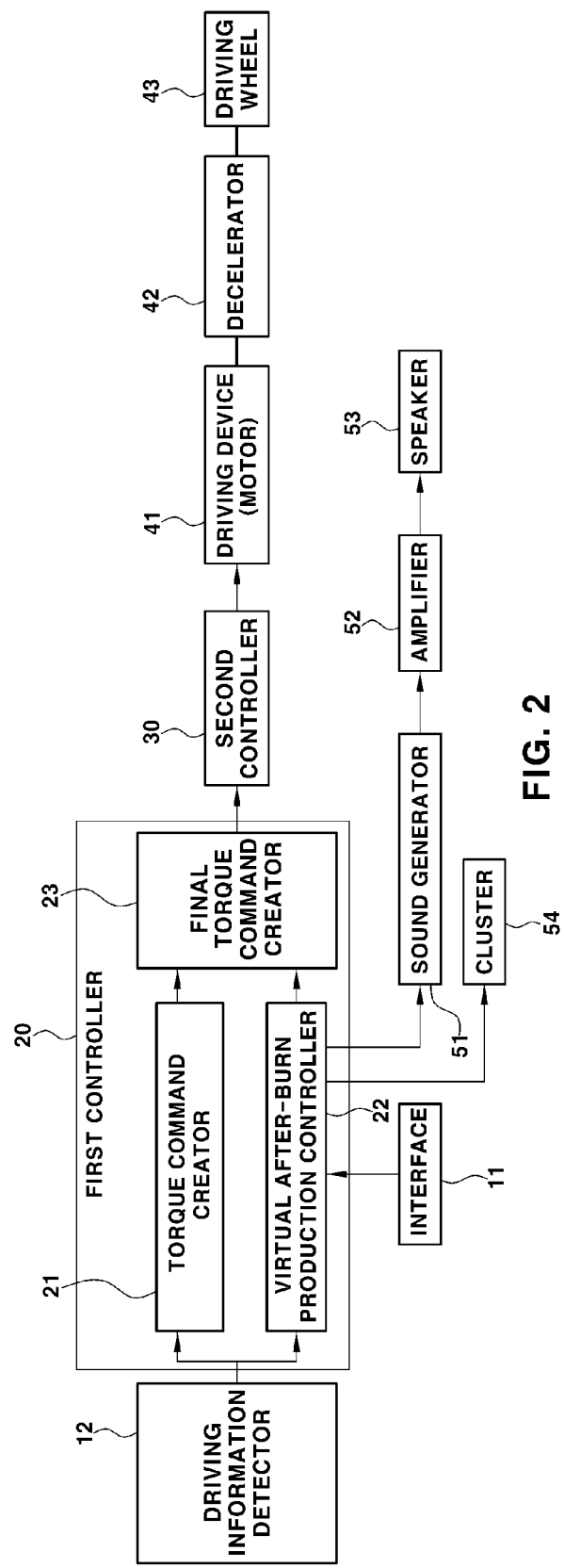
FIG. 2 is a block diagram showing a virtual after-burn sound playing apparatus according to an exemplary embodiment of the present invention.
Figure 3:
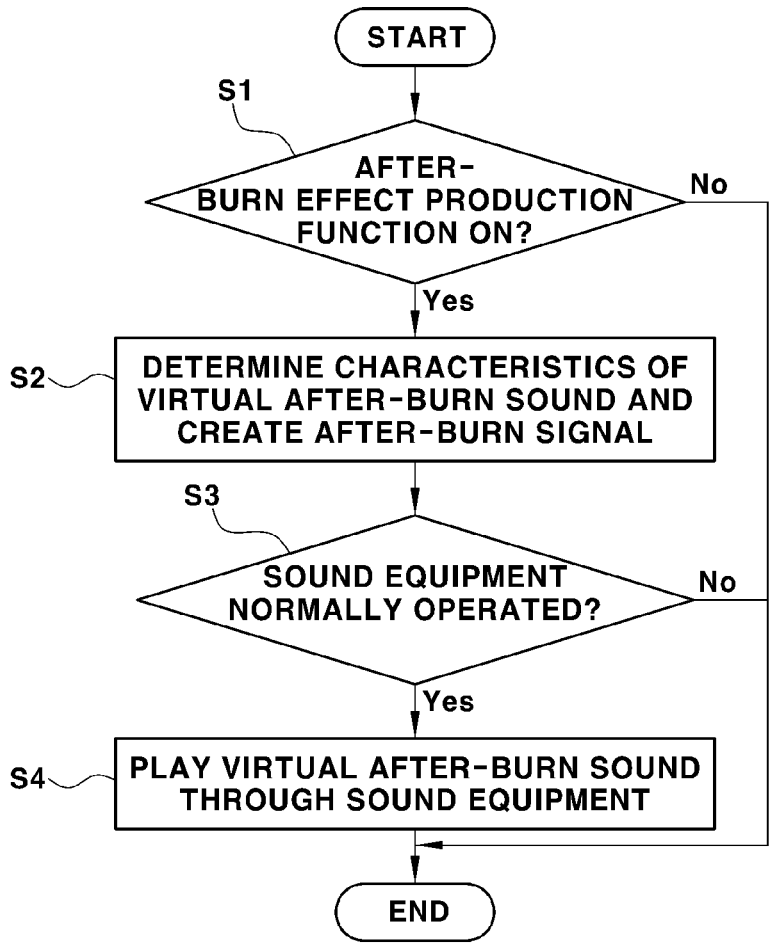
FIG. 3 is a flowchart showing a virtual after-burn sound playing process according to an exemplary embodiment of the present invention.

FIG. 2 is a block diagram showing a virtual after-burn sound playing apparatus according to an exemplary embodiment of the present invention, and FIG. 3 is a flowchart showing a virtual after-burn sound playing process according to an exemplary embodiment of the present invention.

As shown in FIG. 2, the virtual after-burn sound playing apparatus according to the exemplary embodiment of the present invention may include a driving information detector 12 configured to detect vehicle driving information, a first controller 20 configured to determine the characteristics of a virtual after-burn sound based on the vehicle driving information detected by the driving information detector 12 and to create/generate and output an after-burn signal for playing the virtual after-burn sound according to the determined characteristics of the virtual after-burn sound, and sound equipment configured to play and output the virtual after-burn sound according to the after-burn signal output by the first controller 20.

Particularly, the sound equipment may include a sound generator 51 configured to process an after-burn signal and to output a sound signal for generating a sound and an amplifier 52 and a speaker 53, such as a woofer, configured to play and output a virtual after-burn sound according to the sound signal. The speaker 53 may be installed at at least one of the interior and the exterior of a vehicle. Preferably, a plurality of speakers 53 may be installed at the vehicle to be used to play a virtual after-burn sound.

In addition, in the present invention, the first controller 20 may be configured to generate and output a torque command based on the vehicle driving information, and a second controller 30 may be configured to operate a driving device 41 according to the torque command output by the first controller 20. The first controller 20 and the second controller 30 are controllers participating in a control process for playing a virtual after-burn sound and producing other virtual after-burn effects in the vehicle and a vehicle traveling control process. In the following description, a control agent will be described as comprising a first controller 20 and a second controller 30. However, the control process for playing the virtual after-burn sound of the vehicle and the traveling control process according to the present invention may also be performed by a single integrated control element instead of a plurality of controllers.

The plurality of controller and the single integrated control element may be commonly referred to as a controller, and the control process for playing the virtual after-burn sound according to the present invention, a description of which will follow, may be performed by the controller. At this time, the controller may commonly refer to the first controller 20 and the second controller 30 in the construction of an exemplary embodiment described below. In addition, the virtual after-burn sound playing apparatus according to the present invention may further include an interface 11 configured to allow a driver to selectively input one of on and off of a virtual after-burn effect production function including a virtual after-burn sound playing function.

Any means capable of allowing the driver to turn the virtual after-burn sound playing function on and off in the vehicle may be used as the interface 11. For example, a manipulation device, such as a button or a switch, provided at the vehicle, or an input device or a touch screen of an audio, video, and navigation (AVN) system may be used. The interface 11 may be connected to the first controller 20. More specifically, the interface 11 may be connected to a virtual after-burn production controller 22, a description of which will follow, of the first controller 20.

When the driver performs on or off manipulation through the interface 11, therefore, an on signal or an off signal from the interface 11 may be input to the virtual after-burn production controller 22 of the first controller 20. As a result, the virtual after-burn production controller 22 of the first controller 20 may be configured to recognize the on or off manipulated state of the virtual after-burn effect production function (including the virtual after-burn sound playing function) by the driver (see step S1 of FIG. 3).

The virtual after-burn sound playing function of outputting the virtual after-burn sound in the internal combustion engine using the sound equipment including the sound generator 51, the amplifier 52, and the speaker 52, during traveling of the vehicle is performed only when the driver inputs on through the interface 11. In addition, when the interface 11 is an input device for vehicles provided in the vehicle, the driver may perform on and off manipulation of the virtual after-burn effect production function through a mobile device as another example of the interface 11. The mobile device must be communicatively connected to a device in the vehicle, e.g. the first controller 20. Accordingly, an input and output communication interface for communicative connection between the mobile device and the first controller 20 is used.

The driving information detector 12 may be configured to detect vehicle driving information (driving variable information) necessary to perform the virtual after-burn sound playing function together with vehicle driving information necessary to create a reference motor torque command in the vehicle. In an exemplary embodiment of the present invention, the driving information detector 12 may include an accelerator detector configured to detect accelerator input information (an accelerator input value) based on driver manipulation of an accelerator, a speed detector configured to detect the speed of the vehicle driving system, and a temperature detector configured to detect the temperature of the power electronic part.

Particularly, the accelerator detector may be a common accelerator position sensor (APS) installed at the accelerator to output an electrical signal based on the driver's accelerator manipulation state. The speed detector may be configured to acquire speed information of the vehicle driving system. The speed information of the vehicle driving system may be one or both of speed and acceleration of the vehicle driving system.

In addition, the speed may be the rotational speed of the motor (motor speed) configured to drive the vehicle, i.e. the driving motor 41, the rotational speed of the driving wheel 43 (driving wheel speed), or the rotational speed of the drive shaft (drive shaft speed). At this time, the speed detector may be a resolver installed at the driving motor 41, a wheel speed sensor installed at the driving wheel 43, or a sensor capable of detecting the drive shaft speed. The acceleration may be obtained by differentiating a speed signal of the speed detector or may be an actually measured acceleration value detected by the acceleration sensor as the speed detector.

The temperature detector may be configured to detect the temperature of the power electronic part, may be a temperature sensor configured to detect the temperature of a corresponding part or a temperature sensor (water temperature sensor) configured to detect the temperature of a coolant used to cool the part. In particular, the power electronic part may be the motor 41 configured to drive the vehicle, an inverter (not shown) configured to drive and control the motor, a battery (not shown) connected to the motor 41 via the inverter to be charged and discharged, or another power electronic part or driving system part related to driving of the motor.

In the present invention, the vehicle driving information may be used for a reference torque command creator 21, a description of which will follow, to create a reference torque command, and may further include vehicle speed. In particular, the driving information detector 12 may further include a vehicle speed detector configured to detect the current traveling vehicle speed, and the vehicle speed detector may include a wheel speed sensor installed at the driving wheel 43 of the vehicle.

The first controller 20 may include a reference torque command creator 21 configured to determine and generate a reference torque command from the vehicle driving information, a virtual after-burn production controller 22 configured to determine the characteristics of a virtual after-burn sound using one or both of the actual driving variable information and the virtual variable information and to generate and output an after-burn signal for playing an after-burn sound according to the determined characteristics of the virtual after-burn sound, and a final torque command creator 23 configured to generate a final torque command from the reference torque command input from the reference torque command creator 21.

The reference torque command may be a motor torque command determined and generated based on the vehicle driving information collected during traveling of a general electric vehicle. The reference torque command creator 21 may be a vehicle control unit (VCU) configured to generated a motor torque command based on vehicle driving information in a general electric vehicle or a portion thereof.

In addition, the virtual after-burn production controller 22 is a control element configured to perform overall control to play a virtual after-burn sound. This is a new component configured to determine the characteristics of a virtual after-burn sound to play the virtual after-burn sound and to generate and output an after-burn signal according to the determined characteristics. This may be added in the vehicle controller as a portion thereof, or may be provided as a separate control element other than the vehicle controller.

The virtual after-burn production controller 22 may be configured to determine the characteristics of a virtual after-burn sound based on the vehicle driving information, which is actual driving variable information in an electric vehicle, or determine characteristics of a virtual after-burn sound using virtual variable information acquired from the actual driving variable information or both the actual driving variable information and the virtual variable information (step S2 of FIG. 3). In addition, in response to determining the characteristics of the virtual after-burn sound, the virtual after-burn production controller 22 may be configured to generate and output an after-burn signal according to the determined characteristics of the virtual after-burn sound (step S2 of FIG. 3).

In addition, the virtual after-burn production controller 22 may be configured to determine an intervention torque command for producing a virtual after-burn effect, which is a correction torque command for realizing virtual vehicle vibration, to produce virtual vehicle vibration due to after-burn using the driving device 41 of the vehicle, i.e. the motor. The intervention torque command for virtual after-burn effect production determined by the virtual after-burn production controller 22 is input to the final torque command creator 23 to be used to correct the reference torque command. At this time, the virtual after-burn production controller 22 may be configured to determine the intervention torque command for virtual after-burn effect production from the determined characteristics of the virtual after-burn sound.

In the final torque command creator 23, the reference torque command input from the reference torque command creator 21 may be corrected by the correction torque command (the intervention torque command for virtual after-burn effect production) input from the virtual after-burn production controller 22. At the time of correction, the intervention torque command for virtual after-burn effect production, which is the correction torque command, may be added to the reference torque command, to calculate the final torque command. The second controller 30 is a controller configured to receive the torque command transmitted from the first controller 20, i.e. the final torque command output from the final torque command creator 23 of the first controller 20, to control operation of the driving device 41.

In the present invention, the driving device 41 may be the motor connected to the driving wheel 43 of the vehicle to drive the vehicle, i.e. the driving motor 41, and the second controller 30 may be a known motor control unit (MCU) configured to drive the motor through the inverter and to control driving of the motor 41 in a general electric vehicle. In an exemplary embodiment of the present invention, the intervention torque command for virtual after-burn effect production is configured to impart vibration for virtual after-burn production to torque of the driving device 41, i.e. the motor, and is configured to produce minute trembling of motor torque matched with the characteristics of the virtual after-burn sound.

The intervention torque command for virtual after-burn effect production may have a command value having a predetermined period and amplitude changed in a waveform. Alternatively, the intervention torque command for virtual after-burn effect production may have a command value interlocked with the characteristics of the virtual after-burn sound. For example, the intervention torque command for virtual after-burn effect production may have a command value in a pulse form corresponding to the intensity, frequency, duration, and time interval of the virtual after-burn sound, among the characteristics of the virtual after-burn sound.

In an exemplary embodiment of the present invention, torque and rotational force output by the driving device 41, i.e. the motor, may be decelerated by a decelerator 42 and transmitted to the driving wheel 43, as shown in FIG. 2. When driving of the motor 41 is adjusted according to the final torque command corrected by the intervention torque command for virtual after-burn effect production, motor torque having minute vibration for simulating vibration at the time of virtual after-burn applied thereto may be output.

As shown in FIG. 3, in response to determining the characteristics of the virtual after-burn sound (step S2 of FIG. 3), the virtual after-burn production controller 22 may be configured to generate and output an after-burn signal according to the determined characteristics of the virtual after-burn sound (step S2 of FIG. 3). In a normal operation state of the sound equipment 51, 52, and 53, the operation of the sound equipment is adjusted according to the after-burn signal, and therefore an after-burn sound is played and output through the sound equipment (steps S3 and S4 of FIG. 3).

In an exemplary embodiment of the present invention, the characteristics of a virtual after-burn sound may include at least one of the realization time at which the virtual after-burn sound starts to be played through the sound equipment 51, 52, and 53, and the intensity, duration, time interval, and frequency band or pitch (high and low) of the virtual after-burn sound.

In FIG. 2, reference numeral 54 indicates a cluster installed at the front of a driver seat of the vehicle, and the current virtual engine speed and virtual shift stage may be displayed together with the current vehicle speed through the cluster 54. Hereinafter, a method of determining the characteristics of a virtual after-burn sound and generating an after-burn signal and a method of playing a virtual after-burn sound will be described in more detail.

In the present invention, an electric vehicle virtually plays and outputs an after-burn sound generated in a high-performance internal combustion engine vehicle such that a driver of the electric vehicle experiences a dynamic driving sensation and dynamic realism. As a result, vehicle performance and emotional performance stimulating instinct are provided to the driver.

An after-burn sound in an internal combustion engine vehicle is a sound generated by forcibly adjusting the number of cylinders into which fuel is injected and ignition timing. In the present invention, an after-burn signal is configured to realize, in an electric vehicle, an after-burn sound generated through single cylinder cut (SCC) logic of an internal combustion engine and a transmission in the internal combustion engine vehicle. In particular, the SCC logic is a logic of injecting no fuel into some of the engine cylinders at the time of upshift such that explosion occurs at the rear end of an exhaust manifold, and induces ignition retardation and a change in air-fuel ratio.

In the present invention, the after-burn signal is a signal matched with the above-described characteristics of the virtual after-burn sound, and is generated to play the virtual after-burn sound through the sound equipment. The characteristics of the virtual after-burn sound may be basically determined using one or both of actual driving variable information and virtual variable information in the electric vehicle.

Particularly, the actual driving variable information may be driving system speed together with motor torque, and the virtual variable information may be virtual engine speed. In addition, the driving system speed may be motor speed, driving wheel speed, or drive shaft speed. Also, in the present invention, the characteristics of the virtual after-burn sound may be determined based on the motor torque and the driving system speed, or may be determined based on the motor torque and the virtual engine speed.

The motor torque may be a motor torque command, which may be the reference torque command. In addition, an accelerator input value (APS value) may be used as the actual driving variable information for determining the characteristics of the virtual after-burn sound, instead of the motor torque. Further, a virtual shift signal obtained in the control process for creating and realizing virtual shift quality may be used as the virtual variable information for determining the characteristics of the virtual after-burn sound, instead of the virtual engine speed or in addition to the virtual engine speed.

Figure 4:
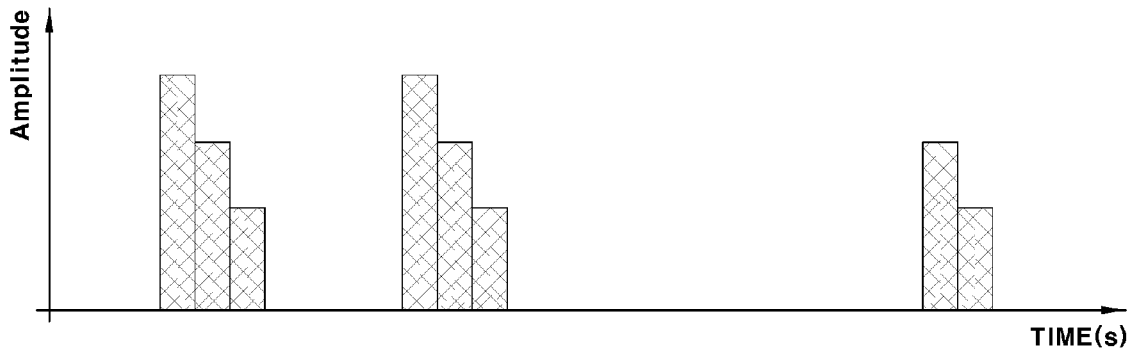
FIG. 4 is a view showing the characteristics of a virtual after-burn sound according to an exemplary embodiment of the present invention.

FIG. 4 is a view showing the characteristics of a virtual after-burn sound in the present invention, which illustrates the realization time and intensity (i.e. volume of the virtual after-burn sound), among the characteristics of the virtual after-burn sound. In the present invention, the realization time, among the characteristics of the virtual after-burn sound, is an element that determines when the virtual after-burn sound starts to be output.

The realization time may be determined from an accelerator input value (APS value) detected by the accelerator detector of the driving information detector, among the actual driving variable information, or may be determined using motor torque or the temperature of the power electronic part. For example, when the state is changed from an APS non-application state in which the driver does not step on or engage the accelerator to an APS application state in which the driver steps on or engages the accelerator or in the case in which an accelerator input value is changed from a value greater than a set value to a value equal to or less than the set value, it may be determined that the realization time has arrived. Alternatively, when motor torque is changed from a positive value to 0 or a negative value or when the temperature of the power electronic part, such as the temperature of the motor or the temperature of the battery, (which may be the temperature of the coolant) is within a predetermined revelation condition range, it may be determined that the realization time has arrived.

In addition, intensity (volume), among the characteristics of the virtual after-burn sound, may be determined to be a small value as the value of the driving system speed or the virtual engine speed is large in consideration of the fact that after-burn intensity increases when a low shift stage of the internal combustion engine vehicle is used. In contrast, the intensity of the virtual after-burn sound may be set to be a large value as a speed value increases. Alternatively, the intensity of the virtual after-burn sound may be set to be a large value as a speed signal is differentiated or an acceleration value acquired from a signal of the acceleration sensor is large, or may be set to be a large value as an acceleration integral value is large.

Further, the intensity of the virtual after-burn sound may be determined to be a greater value as the accelerator input value (APS value) increases, and may be determined to be a larger value as the downward gradient of the accelerator input value increases and as an integral value of the accelerator input value increases. In addition, the intensity may be determined to be a larger value as the motor torque is high, and may be determined to be a larger value as the downward gradient of the motor torque is large and as an integral value of the motor torque is large. In addition, the intensity may be set to be a larger value when the temperature of the power electronic part is within a predetermined set range than when the temperature of the power electronic part deviates from the set range.

When a virtual after-burn effect is expressed in the form of a sound, a frequency (frequency band or pitch), which is high and low of the sound, may be adjusted, and it may be possible to set the frequency with respect to the same input variables used for intensity setting described above using the same interlocking methods. In addition, duration after output of the virtual after-burn sound may be set, and it may be possible to set the duration with respect to the same variables used for intensity setting described above using the same interlocking methods. In general, the after-burn sound is continuously generated in an impulsive form in a bundle during a predetermined duration. At this time, it may be possible to set a time interval between continuously generated after-burn sounds. It may also be possible to set the time interval with respect to the same variables used for intensity setting described above using the same interlocking methods.

Figure 5:
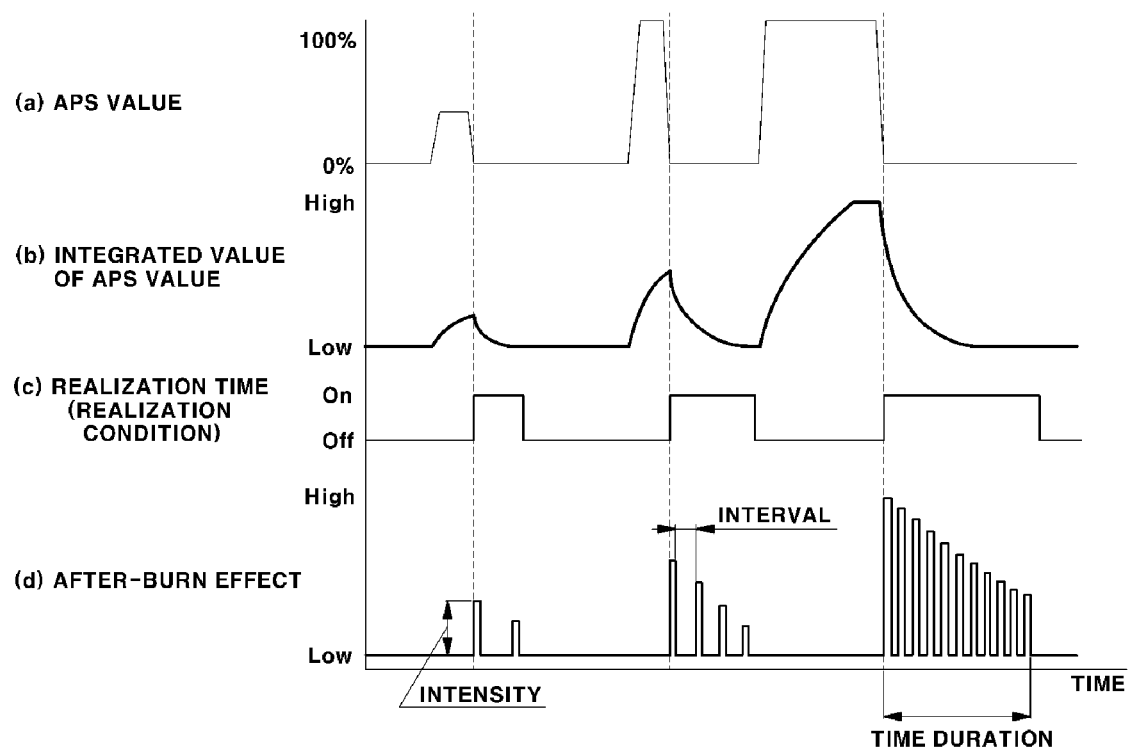
FIG. 5 is a view illustrating the characteristics of a virtual after-burn sound determined according to an accelerator input value (APS value) and an integral value thereof in an exemplary embodiment of the present invention.

FIG. 5 is a view illustrating the characteristics of a virtual after-burn sound determined according to an accelerator input value (APS value) and an integral value thereof in an exemplary embodiment of the present invention, showing examples of the realization time, intensity, duration, and interval of the virtual after-burn sound. In FIGS. 4 and 5, the amplitude value on the Y axis indicates the intensity (volume) of the virtual after-burn sound, the value on the X axis indicates the realization time at which the virtual after-burn sound starts to be played and duration. The characteristics of the virtual after-burn sound shown in FIGS. 4 and 5 are illustrative, and the present invention is not limited thereto. The realization time, intensity, duration, and interval of the virtual after-burn sound may be variously changed.

Figure 6:
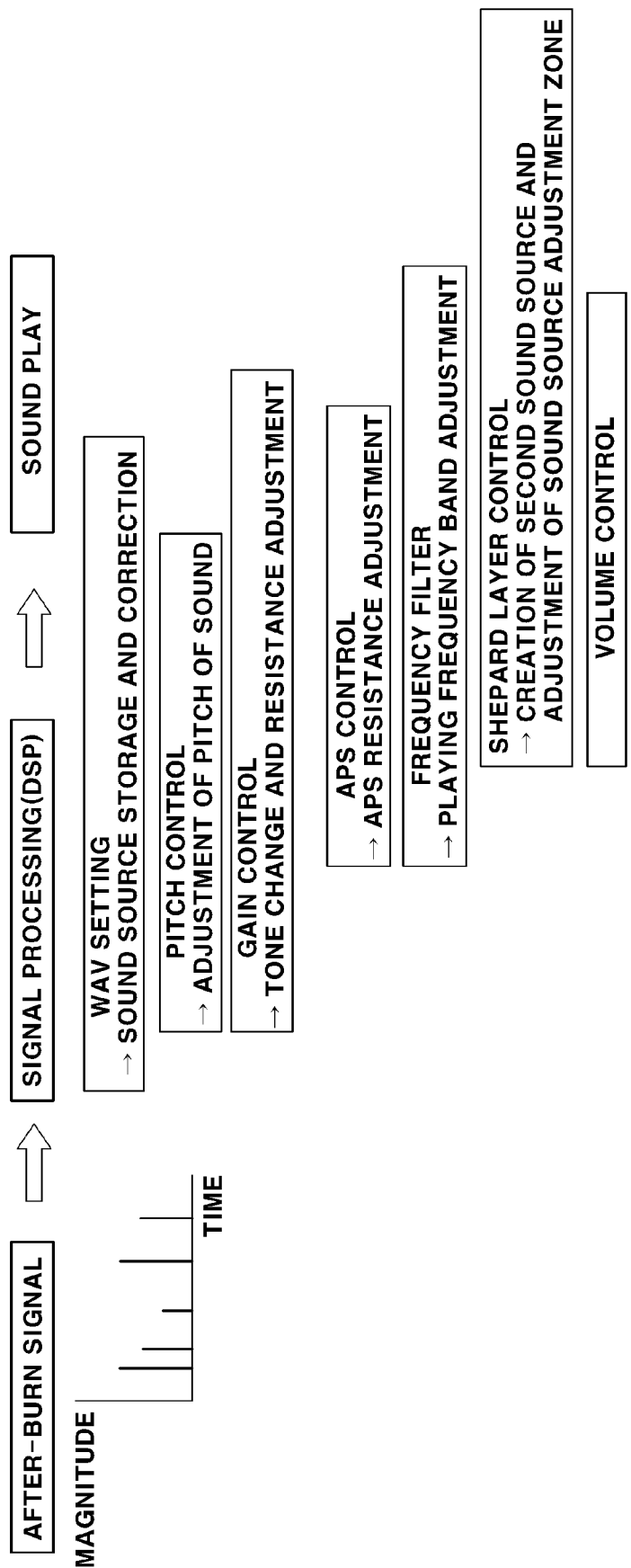
FIG. 6 is a view showing an after-burn signal and sound generation process based on the characteristics of a virtual after-burn sound in an exemplary embodiment of the present invention.

FIG. 6 is a view showing an after-burn signal and sound generation process based on the characteristics of a virtual after-burn sound in an exemplary embodiment of the present invention. In response to determining the characteristics of the virtual after-burn sound, as described above, an after-burn signal matched with the determined characteristics of the virtual after-burn sound is generated. An example of the after-burn signal is shown in the left side of FIG. 6. As previously described, the virtual after-burn production controller 22 may be configured to generate and output an after-burn signal according to the characteristics of the virtual after-burn sound, and the after-burn signal may be transmitted to the sound generator 51.

The sound generator 51 may include a digital signal processor (DSP) as a main component for sound source playing. The after-burn signal corresponds to a sound source signal for outputting a virtual after-burn sound. The digital signal processor (DSP) of the sound generator 51 may be configured to convert and process an after-burn signal input through a sound source input end under control of a CPU. In addition, a sound signal generated as the result of digital signal processor processing of the after-burn signal may be amplified by the amplifier 52 and output to each speaker 53 in the vehicle.

In general, an after-burn sound in a high-performance internal combustion engine vehicle may be generated through an exhaust system at the interior of the vehicle. In the present invention, a virtual after-burn sound in the electric vehicle may be played in the state in which the interior and the exterior of the vehicle are separated from each other, similarly to the high-performance internal combustion engine vehicle, in consideration thereof, whereby it may be possible to realize the same emotion as in the internal combustion engine vehicle.

Accordingly, in an exemplary embodiment of the present invention, the virtual after-burn production controller 22 may be configured to generate a traveling signal for playing a virtual traveling sound based on the current actual vehicle driving information (driving variable information) collected in the vehicle and to transmit the traveling signal to the sound generator 51 separately from the after-burn signal. As a result, a virtual traveling sound (a traveling sound) interlocked with the traveling signal may be played and output through a single speaker or a plurality of speakers installed at the interior of the vehicle.

In addition, the traveling sound interlocked with the traveling signal may be played and output, and the after-burn sound interlocked with the after-burn signal may be played and output, through a plurality of speakers installed at the exterior of the vehicle. At this time, the after-burn sound may be played and output through a speaker installed at the rear of the vehicle in a forward-rearward direction of the vehicle, among the speakers installed at the exterior of the vehicle. Alternatively, the after-burn sound may be played and output through the speaker installed at the interior of the vehicle.

The digital signal processor (DSP) of the sound generator 51 may be configured to store and modify an after-burn signal, which is a sound source signal, and a traveling signal, adjust the pitch of a sound (high and low of a sound), and change tone and adjust resistance through gain control. In addition, APS resistance may be adjusted through APS control, and a playing frequency band may be adjusted through a frequency filter. In addition, a second sound source may be generated and a sound source adjustment zone is adjusted through shepard layer control. In addition, the volumes of a virtual after-burn sound and a traveling sound are adjusted.

Meanwhile, the present invention may be configured to provide various sound patterns to improve user emotional quality in playing and producing an after-burn sound of an internal combustion engine vehicle in an electric vehicle. In an exemplary embodiment of the present invention, a method of locating a sound source at the rear end of the exhaust manifold may be applied as a virtual after-burn sound playing scheme. In particular, the driver feels as if an after-burn sound were generated at the rear of the vehicle. Alternatively, in the present invention, a scheme of providing various patterns of after-burn sounds using sound separation and playing technology may be applied as another virtual after-burn sound playing scheme, since there is a restriction in freely disposing the speakers 52 of the sound equipment in the vehicle due to a limitation on a vehicle package.

Figure 7:
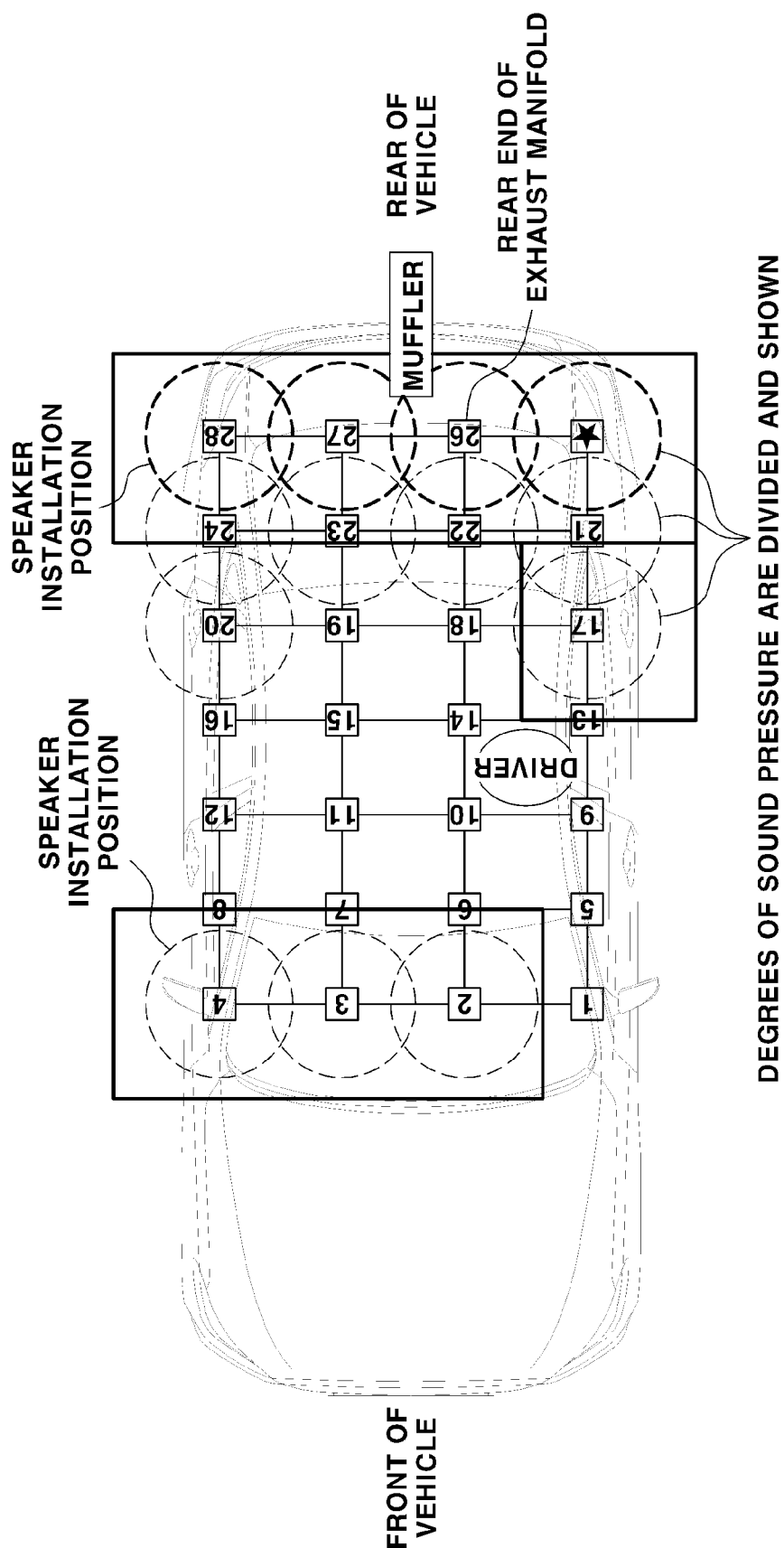
FIG. 7 is a view showing a playing scheme in which a sound source is located at the rear end of an exhaust manifold in an exemplary embodiment of the present invention.

FIG. 7 is a view showing a playing scheme in which a sound source is located at the rear end of the exhaust manifold in an exemplary embodiment of the present invention, showing an example in which a plurality of speakers is installed at front and rear positions of the interior or the exterior of the vehicle. That the sound source is located at the rear end of the exhaust manifold indicates that a virtual after-burn sound may be played and output at the tail of the vehicle corresponding to the downstream side of the exhaust manifold based on the direction in and path along which exhaust gas flows even in an exhaust system of an internal combustion engine vehicle.

In the present invention, it is necessary to adjust the position of a sound in playing and outputting a virtual after-burn sound through the sound equipment such that emotion of an after-burn sound that may be felt in an internal combustion engine vehicle is felt even in an electric vehicle. Accordingly, a virtual after-burn sound may be played and output through speakers installed at the rear of the vehicle in a forward-rearward direction of the vehicle at the interior or the exterior of the vehicle.

Alternatively, at the time of playing through the speakers installed at the interior of the vehicle, a channel for playing general music and a channel for playing a virtual after-burn sound are separated from each other, and the sound pressure of the speakers located at the front of the vehicle may be decreased and the sound pressure of the speakers located at the rear of the vehicle may be increased at the time of playing and outputting the virtual after-burn sound. As a result, it may be possible to provide emotion somewhat discriminated from an after-burn sound in an internal combustion engine vehicle while copying the after-burn sound in the internal combustion engine vehicle.

Alternatively, sound playing delay may be adjusted for each channel with respect to the plurality of speakers installed at the interior of the vehicle to adjust the position at which sounds join at the interior of the vehicle to be a rear position of the vehicle. Even in this case, the same effect as adjusting the position of the sound may be achieved. In the scheme of adjusting the sound pressure for each vehicle position and channel or the scheme of adjusting the delay, as described above, it may be possible to play various and creative virtual sounds, since the degree of freedom in design is high in all of the schemes.

Figure 8:
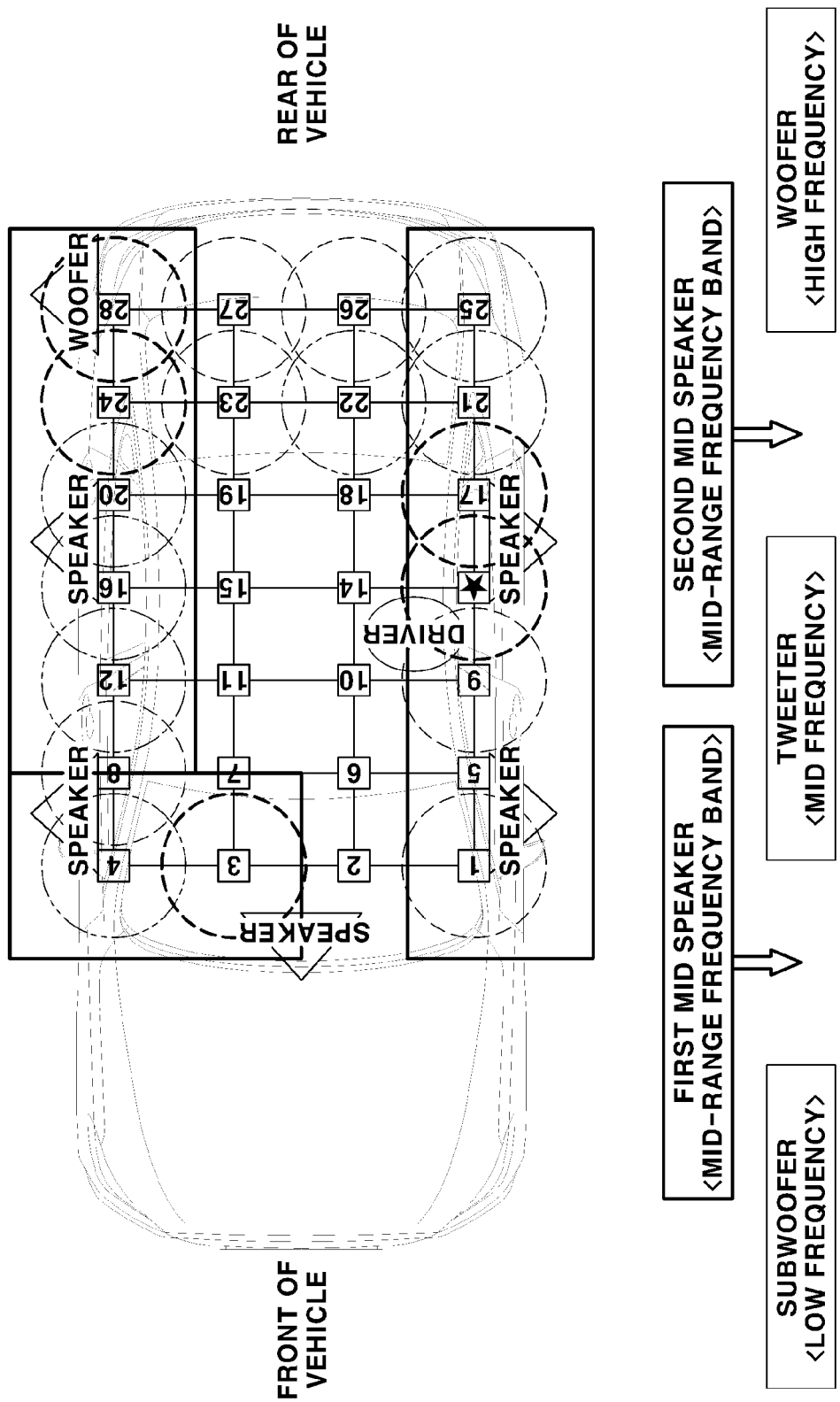
FIG. 8 is a view describing a playing scheme using sound separation and playing technology in an exemplary embodiment of the present invention.

FIG. 8 is a view describing a playing scheme using sound separation and playing technology in an exemplary embodiment of the present invention, wherein a virtual after-burn sound may be played at five stages using a five-way speaker, whereby it may be possible to increase the degree of freedom in design and to improve sensation of acceleration and emotional quality that the driver feels.

Referring to FIG. 8, in an exemplary embodiment of the present invention, the five-way speaker of the sound equipment for playing and outputting a virtual after-burn sound may include a subwoofer, a tweeter, a woofer, and two mid speakers. In other words, the sound equipment may have a subwoofer configured to play and output a sound having a predetermined low-frequency band, a tweeter configured to play and output a sound having a predetermined mid-frequency band, a woofer configured to play and output a sound having a predetermined high-frequency band, a first mid speaker configured to play and output a sound corresponding to a mid-range frequency band between the low frequency and the mid frequency, and a second mid speaker configured to play and output a sound corresponding to a mid-range frequency band between the mid frequency and the high frequency, as a plurality of speakers 53 installed at the interior or the exterior of the vehicle to play and output a virtual after-burn sound.

Particularly, the low-frequency band, the mid-frequency band, and the high-frequency band are frequency bands preset and designed to be played and output by the subwoofer, the tweeter, and the woofer, respectively, and the mid-range frequency band of the sound played and output by each mid speaker is also preset for each speaker.

In the present invention, as described above, an electric vehicle including no internal combustion engine is capable of virtually playing and outputting an after-burn sound in an internal combustion engine vehicle depending on the driving condition of the vehicle through the above speakers. Consequently, it is possible to improve marketability and emotional quality of the electric vehicle.

Meanwhile, the virtual after-burn sound playing method of the electric vehicle according to the exemplary embodiment of the present invention may further include a correction process for discriminating between individual virtual after-burn sounds. In particular, the correction process for discriminating between individual virtual after-burn sounds may include a process of recognizing, by the controller of the vehicle, the tendency of a driver and a process of correcting the characteristics of an after-burn sound according to the recognized tendency of the driver.

In an exemplary embodiment of the present invention, the controller may be configured to utilize and analyze music information of a driver's mobile phone to recognize the tendency of the individual driver. When the music information of the mobile phone is utilized, as described above, it may be possible to recognize the character, taste, current feeling, or mood of the individual driver, whereby it may be possible to discriminate between after-burn sounds. In particular, the mobile phone may be understood as a personal portable terminal including a smart device, such as a smartphone that is portable and is capable of performing communication, using the Internet, and executing applications or a tablet PC.

In an exemplary embodiment of the present invention, the controller may be configured to collect driver driving manipulation information during traveling of the vehicle as the driving pattern information and use the collected driving manipulation information to determine and recognize the driving tendency of the individual driver. In particular, the driving tendency of the individual driver may be acceleration tendency, and the collected driving manipulation information may be information about driver's accelerator manipulation.

Additionally, in an exemplary embodiment of the present invention, the controller may be configured to determine and recognize the driving tendency of the driver using accelerator pedal force information provided by the accelerator detector (APS). At this time, the controller may be configured to apply the average travel distance and the number of accelerator manipulations, as additional information, to the accelerator pedal force manipulated by the driver to determine the driving tendency (the acceleration tendency) of the driver.

In particular, the accelerator pedal force may be classified as heavy tip in (HTI), middle tip in (MTI), or light tip in (LTI). At this time, when the accelerator pedal force is equal to or greater than middle tip in (MTI) or the accelerator is frequently manipulated more than necessary from information about the accelerator pedal force, the average travel distance, and the number of accelerator manipulations, the controller may be configured to determine that the driving tendency of the driver is the driving tendency to mainly perform sudden acceleration. Additionally, when the accelerator pedal force is equal to or less than light tip in (LTI), the controller may be configured to determine that the driving tendency of the driver is the driving tendency mainly performing gradual acceleration.

Figure 9:
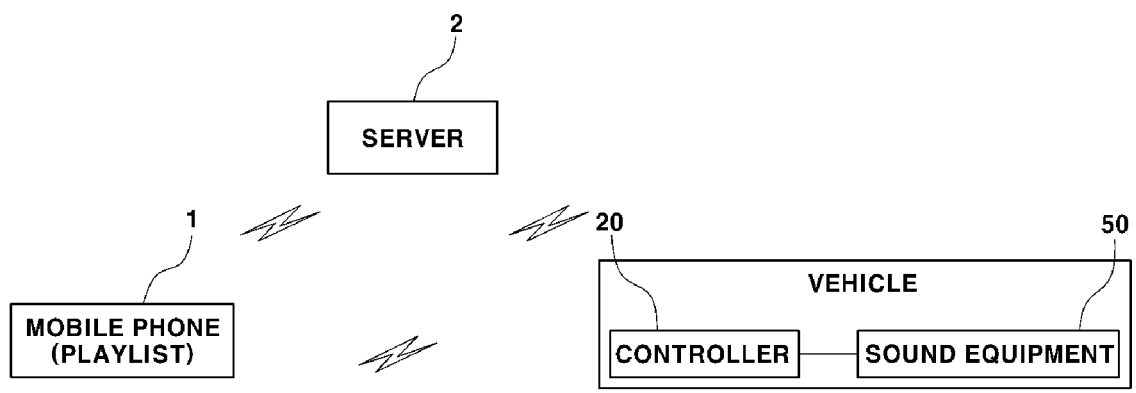
FIG. 9 is a view showing the construction of an apparatus that plays a virtual after-burn sound individually discriminated based on information about music played in a driver's mobile phone in an exemplary embodiment of the present invention.
Figure 10:
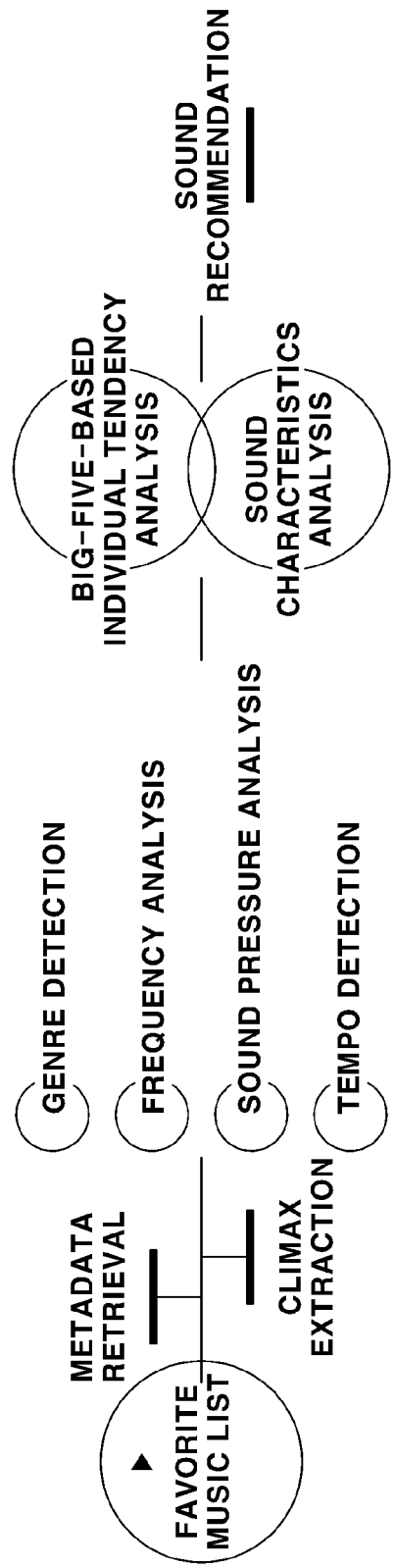
FIG. 10 is a view describing a method of recommending a sound based on music information in an exemplary embodiment of the present invention.
Figure 12:
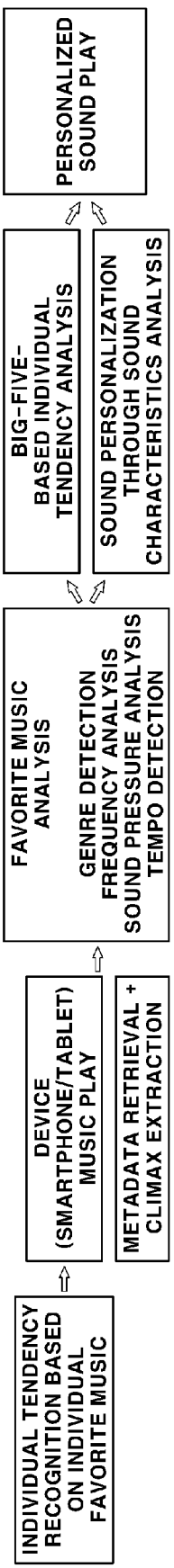
FIG. 12 is a view showing a process for individual discrimination of a virtual after-burn sound according to an exemplary embodiment of the present invention.

Hereinafter, a method of utilizing individual mobile phone music information will be described in more detail. FIG. 9 is a view showing the construction of an apparatus that plays a virtual after-burn sound individually discriminated based on information about music played in a driver's mobile phone in an exemplary embodiment of the present invention. In addition, FIG. 10 is a view describing a method of recommending a sound based on music information in an exemplary embodiment of the present invention. FIG. 11 is a view showing the operation state and operation process of a mobile phone application for individual discrimination of a virtual after-burn sound in an exemplary embodiment of the present invention. FIG. 12 is a view showing a process for individual discrimination of a virtual after-burn sound according to an exemplary embodiment of the present invention.

FIGS. 13 to 18 are reference views for describing an exemplary embodiment of the present invention. FIGS. 13 and 14 show energy average charts by music genre, and FIG. 15 is a table showing range separation and vehicle sound correlation determination after Fast Fourier Transform (FFT) processing of a sound source signal.

First, as shown in FIG. 9, a driver's mobile phone 1, an external server 2, and a controller 20 of a vehicle are communicatively connected to each other. In particular, the controller 20 of the vehicle may be a single integrated control element configured to perform control for playing a virtual after-burn sound. Alternatively, the controller 20 of FIG. 9 may be the first controller of FIG. 2, and specifically may be the virtual after-burn production controller 22 of the first controller. In addition, the external server 2 may be a server of a company that provides only a music service or a music streaming service to mobile phone users. At this time, an input and output communication interface for communicative connection between the driver's mobile phone 1, the external server 2, and the controller 20 of the vehicle is used such that the driver's mobile phone 1, the external server 2, and the controller 20 of the vehicle communicate with each other to transmit and receive information therebetween.

In the construction of FIG. 9, the driver may newly configure a playlist of desired pieces of music in a music playing application executed in a mobile phone when listening to music through their mobile phone 1, or may select a desired playlist and play pieces of music in the playlist. At this time, the external server 2 may be configured to provide a music streaming service such that pieces of music in the playlist may be played through the application in the driver's mobile phone 1. At this time, the application of the mobile phone 1 analyzes the tendency of the driver using information about the played pieces of music, and transmits the analysis result, i.e. driver tendency information, from the driver's mobile phone 1 to the controller 20 of the vehicle.

Driver tendency analysis may be performed by the external server 2, rather than the application of the mobile phone 1. In particular, the external server 2 may be configured to transmit the driver tendency information to the controller 20 of the vehicle. Alternatively, the controller 20 of the vehicle may be configured to receive the playlist from the mobile phone 1 to perform the driver tendency analysis, and may be configured to generate and acquire driver tendency information as the analysis result.

Accordingly, the controller 20 of the vehicle may be configured to correct the characteristics of an after-burn sound using the driver tendency information to play and output a discriminated virtual after-burn sound through the sound equipment 50. At this time, the controller 20 of the vehicle may be configured to correct the characteristics of a virtual after-burn sound based on the tendency information of the individual driver, generate an after-burn signal matched with the corrected characteristics of the virtual after-burn sound, and transmit the after-burn signal to the sound equipment 50. Accordingly, the sound equipment 50 may be configured to play and output an individually discriminated virtual after-burn sound.

FIG. 10 shows a driver's mental state modeling methodology and a sound discrimination method and shows a process of analyzing, the mobile phone 1, pieces of music played with reference to a playlist consisting of pieces of music that the driver prefers to acquire driver tendency information. The driver tendency information obtained by analyzing information of pieces of music played through the playlist may refer to information including musical taste and temporary mental state, feeling, or mood of the driver during listening to music as well as the character or tendency of the driver.

In an exemplary embodiment of the present invention, in analyzing information of pieces of music constituting a playlist to acquire driver tendency information, the application of the mobile phone 1 (or the server or the controller of the vehicle) may be configured to retrieve metadata of a sound source played in the playlist and may extract climax to perform genre detection, frequency analysis, sound pressure analysis, and tempo detection processes. In addition, the application of the mobile phone 1 (or the server or the controller of the vehicle) may be configured to perform big five individual tendency analysis and sound characteristics analysis processes to create driver tendency information for sound recommendation.

Referring to FIG. 11, the driver who uses the application of the mobile phone 1 selects a preconfigured playlist after boarding the vehicle, or configures a playlist suitable for their musical taste using a music retrieval function. When the driver listens to music for a predetermined time, the application automatically analyzes the tendency of the driver to create driver tendency information and selects an optimum sound. In addition, after driver tendency information creation and sound selection, it may be possible for the driver to construct sound information related to their tendency as a database for personalization and common use in the application.

Additionally, in an exemplary embodiment of the present invention, vehicle soundscape may be applied using current emotion of the driver and music information of the mobile phone 1. Soundscape is a compound word of sound and environment and is technology for expressing sound as an agent capable of leading a space, rather than simply belonging to the space.

In an exemplary embodiment of the present invention, individual driver tendency including the feeling or mood of the driver is analyzed and recognized utilizing music information of the mobile phone 1 for each individual driver for individual discrimination of a virtual after-burn sound, and driver tendency information is created and provided. FIG. 12 shows that, to this end, the genre detection, frequency analysis, sound pressure analysis, and tempo detection processes are performed to play a personalized after-burn sound.

In FIGS. 10 and 12, climax extraction indicates that Short-time Fourier Transform (SFT) is performed for the sound source of music to acquire the average of the amplitude of a sound source signal for each period through the Fast Fourier Transform (FFT), the averages for respective periods are compared to determine a period higher than the total average, and a period having the highest sound pressure (volume) within a corresponding period is selected as a climax. The reason that the climax is extracted is that, in the case in which analysis is performed including the entirety of playing time to reflect music characteristics in a virtual sound, there is a high possibility of factors, such as narration, pause, and abrupt melody switch, acting as noise in determining the music characteristics. However, when the climax of music is accurately extracted and analyzed and a high-importance period that an actual listener strongly recognizes is selectively utilized, it is possible to increase accuracy.

In analyzing favorite music, genre detection may use metadata in a music file or a playlist. Alternatively, a representative tone or melody may be created and stored, a genre may be preset to the stored representative tone or melody, and an actual driver may compare the same with music played in the mobile phone to determine similarity, whereby it is possible to detect the genre of music played.

Additionally, in frequency analysis, a time-based sound source may be converted into a frequency-based sound source utilizing Fast Fourier Transform (FFT) in order to calculate energy of music and energy for each range. Subsequently, as shown in FIG. 13, the range may be divided into multiple sections, such as "Bass" of 20 to 200 Hz, "Low-mid" of 200 to 700 Hz, "Mid-mid" of 700 to 2,000 Hz, "High-mid" of 2,000 to 5,000 Hz, and "Treble" of 5,000 to 20,000 Hz, based on "Sound Engineering Theory" (Dittmar, Tim. Audio Engineering 101). At this time, the range energy of music may be compared with the range energy of the vehicle for relative determination and application. In other words, as shown in FIG. 14, the sound of the vehicle may be expressed as "Booming" of 20 to 200 Hz, "Rumble" of 200 to 500 Hz, "Combustion Noise" of 500 to 1000 Hz, and "High Frequency Noise" of 1000 Hz of higher based on general NVH standards of the vehicle.

This may be connected to the range of music. Consequently, "Bass" of music may be determined as the energy of "Booming", "Bass-middle" may be determined as "Rumble" of the engine, the "Middle" section including human vocal may be determined as the "Combustion Noise" section, and finally the "Middle-Treble" and "Treble" sections may be related to "High Frequency Noise".

In sound pressure analysis, among the processes shown in FIGS. 10 and 12, determination may be performed through a correlation connected to music genre preference—big five model—personalized driver tendency information creation and virtual sound recommendation, although sound pressure may be analyzed and determined based simply on the magnitude of the entire sound of the sound source. Even for a virtual sound of the same vehicle, different results may be obtained in sound pressure analysis due to masking by background noise or a sound generated from an actual vehicle driving system or limitation of a sound system.

Although there is some difference depending on auditory sensitivity of individuals, people may distinguish a difference of 3 to 5 dB or higher on average. Consequently, "OFF" may be set based on the point at which the overall level between background noise and a created virtual sound is less than 3 dB, and the sound pressure of the virtual sound may be divided into multiple steps. As an example, the sound pressure steps may be divided into a total of four steps, such as "OFF", "+5 dB", "+10 dB", and "+15 dB", and the energy steps of the virtual sound may be determined based on the average energy of a music playlist.

As the result of selecting popular songs by genre and analyzing energies of 100 songs in "Melon", which is a music streaming service in Korea, the average of the entire music was −13.66 dB, the minimum value was −25 dB, and the maximum value was −7.85 dB. In addition, as shown in FIG. 15, in the average by genre, EDM was −9.73 dB, new age was −19.79 dB, rap/hip-hop was −10.72 dB, rock/metal was −12.52 dB, ballad was −13.15 dB, jazz was −16.98 dB, classical was −20.08 dB, and trot was −10.72 dB. In the case in which the energy of the driver's recent playlist is −22 dB or less, the energy step of an after-burn sound may be set to "OFF" based on the analysis results. 22 dB to −13.5 dB may be set to "+5 dB", −13.5 dB to −10 dB may be set to "+10 dB", and greater than −10 dB may be set to "+15 dB".

The "big five" model in FIGS. 10 and 12 is a widely recognized in modern psychology, and the reliability thereof has been proved through a plurality of research results. According to this model, as shown in FIG. 16, human tendency is classified into a total of five representative characteristics, such as neuroticism, extraversion, agreeableness, conscientiousness, and openness to experience. Research into correlation between individual tendency and music preference based on the big five model has been performed in many cultural areas on a large scale.

Representatively, in the thesis of Rentfrow & Gosling published in 2003, factor analysis was performed with respect to music preference information of more than 3,500 people, fourteen music genres were classified into four dimensions, such as "Reflective & Complex", "Intensive & Rebellious", "Upbeat & Conventional", and "Energetic & Rhythmic", as shown in FIG. 17, and the tendency of people who prefer each dimension was investigated. 1) Correlation between music and individual tendency, 2) correlation between music and cognitive ability, and 3) correlation between music and self-identity, mentioned above, are included as research results.

The "Reflective & Complex" group is known to have a tendency of positively exhibiting imaginative power, attaching importance to aesthetic experience, being intellectual, being generous to other people, and refusing conservative things. The "Intensive & Rebellious" group is known to have a tendency of having curiosity about other things, taking risks, being physically active, and thinking they are intellectual. The "Upbeat & Conventional" group has a tendency of being cheerful, social, and reliable, helping other people with pleasure, feeling that they are physically attractive, and being relatively ordinary. Finally, it was investigated that the "Energetic & Rhythmic" group has a tendency of being talkative, having plentiful energy, being merciful, feeling that they are physically attractive, and avoiding conservative features.

FIG. 18 is a view showing an example in which driver tendency is determined using music information in an exemplary embodiment of the present invention. As shown, numerical data corresponding to the tendency of the driver by pre-sorted tendency group may be obtained using a numerical formula or method set based music information of the driver, and the tendency of the driver may be finally determined based on the numerical data.

More specifically, in the present invention, as previously described, emotion is recognized utilizing mobile phone music information by user individual for after-burn-based individual sound discrimination in the electric vehicle, and genre detection, frequency analysis, sound pressure analysis, and tempo detection processes are performed in order to recommend a sound in the electric vehicle.

The driver tendency may be classified into a total of 5 representative characteristics, such as neuroticism, extraversion, agreeableness, conscientiousness, and openness to experience, utilizing the individual mobile phone music information, as will be described below. It may be possible to use a vehicle soundscape algorithm such that a conventional after-burn sound may be corrected using a plurality of patterns in consideration of the above tendency.

The sound of the vehicle may be expressed as "Booming" of 20 to 200 Hz, "Rumble" of 200 to 500 Hz, "Combustion Noise" of 500 to 1000 Hz, and "High Frequency Noise" of 1000 Hz or higher based on general NVH standards of the vehicle. When describing in connection with the preferred range of mobile phone music, "Bass" of music may be related to the energy of "Booming", "Bass-middle" may be related to "Rumble" of the engine, the "Middle" section including human vocal may be related to the "Combustion Noise" section, and finally the "Middle-Treble" and "Treble" sections may be related to "High Frequency Noise".

A soundscape algorithm having the above concept reflected therein may be used, and a virtual sound by driving pattern may be discriminated based on driver emotion modeling for actual vehicle application. At this time, a target sound may be realized through active sound design (ASD), and personalized sound playing technology may be realized through a target sound automation process. When information having the driver emotion by individual reflected therein is analyzed to provide a personalized electric vehicle soundscape, it may be possible to improve emotional quality of the vehicle.

In the present invention, as described above, information about pieces of music that the driver listens to is analyzed to determine the tendency of the driver, and a virtual after-burn sound is discriminated and played according to the determined tendency of the driver, whereby it possible to improve marketability and emotional quality of the electric vehicle.

As is apparent from the foregoing, in a virtual after-burn sound playing apparatus and method of an electric vehicle, an electric vehicle including no internal combustion engine is capable of virtually playing and outputting an after-burn sound in an internal combustion engine vehicle depending on the driving condition of the vehicle through speakers of the vehicle. Furthermore, a virtual after-burn sound is discriminated and produced according to the tendency of an individual driver. Consequently, it may be possible to substantially improve marketability and emotional quality of the electric vehicle.

The effects of the present invention are not limited to those mentioned above, and other unmentioned effects will be clearly understood by an ordinary skilled person from the above description. It will be apparent to a person of ordinary skill in the art that the present invention described above is not limited to the above exemplary embodiments and the accompanying drawings and that various substitutions, modifications, and variations can be made without departing from the technical idea of the present invention.

What is claimed is:

1. A method of playing a virtual after-burn sound in an electric vehicle, comprising:
    acquiring, by a controller, driver tendency information generated based on information of music played in a mobile phone;
    collecting, by the controller, driving variable information for playing a virtual sound during operation of the vehicle, wherein the driving variable information is actual vehicle driving information detected by one or more sensors;
    determining, by the controller, characteristics of a virtual after-burn sound based on the collected driving variable information; wherein the virtual after-burn sound represents an explosion occurring within an exhaust line of an internal combustion engine vehicle;

correcting, by the controller, the characteristics of the virtual after-burn sound according to the acquired driver tendency information;

generating, by the controller, an after-burn signal for playing the virtual after-burn sound based on information about the corrected characteristics of the virtual after-burn sound; and operating, by the controller, sound equipment according to the generated after-burn signal to play and output a virtual after-burn sound discriminated according to the driver tendency from the sound equipment.

2. The method according to claim 1, wherein a driver tendency analysis process including genre detection, frequency analysis, sound pressure analysis, and tempo detection is performed with respect to pieces of music of a playlist played in the mobile phone to generate the driver tendency information.

3. The method according to claim 2, wherein metadata of a sound source is retrieved and a climax is extracted with respect to the pieces of music of the playlist played in the mobile phone, and the driver tendency analysis process including genre detection, frequency analysis, sound pressure analysis, and tempo detection is performed using the metadata and climax portions.

4. The method according to claim 2, wherein the driver tendency analysis process is performed in an application of the mobile phone in which the music of the playlist is played, and driver tendency information generated through the driver tendency analysis process in the mobile phone is provided to a controller of the vehicle.

5. The method according to claim 2, wherein the driver tendency analysis process is performed in a server configured to provide a music streaming service according to the playlist of the mobile phone, and driver tendency information generated through the driver tendency analysis process in the server is provided to a controller of the vehicle.

6. The method according to claim 2, wherein the controller is configured to receive the playlist from the mobile phone and perform the driver tendency analysis process with respect to the pieces of music of the playlist to generate the driver tendency information to be used to correct the characteristics of the virtual after-burn sound.

7. The method according to claim 1, wherein the characteristics of the virtual after-burn sound include a realization time, which is a point in time at which the virtual after-burn sound starts to be played through the sound equipment.

8. The method according to claim 7, wherein the characteristics of the virtual after-burn sound include at least one of an intensity, duration, time interval, and frequency band or pitch, which indicates high and low, of a sound simulating the after-burn sound.

9. The method according to claim 1, wherein the driving variable information includes at least one of a user's accelerator input value, a motor torque command, driving system speed information, and a temperature of a power electronic part.

10. The method according to claim 9, wherein the driving system speed information is:
a set one of a motor speed, which is a rotational speed of a driving motor, a wheel speed of a driving wheel, and a drive shaft speed; or
a rotational acceleration of a set one of the motor, the driving wheel, and the drive shaft.

11. The method according to claim 9, wherein:
the driving system speed information is a virtual engine speed determined from a driving system speed,
the driving system speed is a set speed of a motor speed, which is a rotational speed of a driving motor, a wheel speed of a driving wheel, and a drive shaft speed, and
the virtual engine speed is determined to be a multiple of the driving system speed.

12. The method according to claim 1, wherein the sound equipment includes:
a sound generator configured to process an after-burn signal and to output a sound signal for generating a sound; and
a speaker configured to play and output a virtual after-burn sound according to the sound signal.

13. The method according to claim 12, wherein the speaker of the sound equipment is installed at at least one of an interior and an exterior of the vehicle.

14. The method according to claim 13, wherein the virtual after-burn sound is played and output through a speaker installed at a rear position in a forward-rearward direction of the vehicle, among speakers installed at the exterior of the vehicle, the interior of the vehicle, or the exterior and the interior of the vehicle.

15. The method according to claim 13, wherein:
the speaker of the sound equipment includes a plurality of speakers installed at the interior of the vehicle, and
when the virtual after-burn sound is played, a sound pressure of a speaker installed at a rear position at the interior of the vehicle in a forward-rearward direction of the vehicle is increased and a sound pressure of a speaker located at a front of the interior of the vehicle is relatively decreased, among the plurality of speakers.

16. The method according to claim 13, wherein:
the speaker of the sound equipment includes a plurality of speakers installed at the interior of the vehicle, and
when the virtual after-burn sound is played, sound playing delay is adjusted with respect to the plurality of speakers for each channel to adjust a position at which sounds join at the interior of the vehicle to be a rear position.

\* \* \* \* \*